US012743567B2

(12) United States Patent
Victory et al.

(10) Patent No.: US 12,743,567 B2
(45) Date of Patent: Sep. 22, 2026

(54) SYSTEMS AND METHODS FOR DESIGNING A DISCRETE DEVICE PRODUCT

(71) Applicant: SEMICONDUCTOR COMPONENTS INDUSTRIES, LLC, Scottsdale, AZ (US)

(72) Inventors: James Joseph Victory, Trabuco Canyon, CA (US); Thomas Neyer, Munich (DE); YunPeng Xiao, Shanghai (CN); Hyeongwoo Jang, Bucheon-Si (KR); Peter Dingenen, Oudenaarde (BE); Vaclav Valenta, Brno (CZ); Mehrdad Baghaie Yazdi, Munich (DE); Christopher Lawrence Rexer, Scottsdale, AZ (US); Stanley Benczkowski, Bear Creek Township, PA (US); Thierry Bordignon, Toulouse (FR); Wai Lun Chu, Kowloon (HK); Roman Sickaruk, Nezamyslice (CZ)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 287 days.

(21) Appl. No.: 18/539,697

(22) Filed: Dec. 14, 2023

(65) Prior Publication Data

US 2024/0119206 A1 Apr. 11, 2024

Related U.S. Application Data

(63) Continuation of application No. 17/930,091, filed on Sep. 7, 2022, now Pat. No. 11,880,642, which is a (Continued)

(51) Int. Cl.
*G06F 30/39* (2020.01)
*G06F 30/31* (2020.01)
(Continued)

(52) U.S. Cl.
CPC ............ *G06F 30/31* (2020.01); *G06F 30/367* (2020.01); *G06F 30/392* (2020.01);
(Continued)

(58) Field of Classification Search
CPC ...... G06F 30/31; G06F 30/367; G06F 30/392; G06F 30/398; G06F 2111/02;
(Continued)

(56) References Cited

U.S. PATENT DOCUMENTS 8,312,404 B2 * 11/2012 Hu ........................ G06F 30/367 716/112
9,286,421 B1 3/2016 Kukal et al.
(Continued)

OTHER PUBLICATIONS

Hampton, L., CAE Workstations and Semicustom IC Vendors Offer Increased Design Flexibility, IEEE Circuits and Devices Magazine, Jul. 1986, pp. 32-35.
(Continued)

*Primary Examiner* — Nghia M Doan
(74) *Attorney, Agent, or Firm* — IPTechLaw

(57) ABSTRACT

Implementations disclosed herein may include receiving from a user a selection of at least one die, a package type, and at least one test condition; generating, using a processor, a product die configuration and a product package configuration using a predictive modeling module and the at least one die and the package type; generating a graphic design system file; generating a package bonding diagram; generating a product spice model of the discrete device product using a technology computer aided design module; generating, using a processor, one or more datasheet characteristics of the discrete device product with the product SPICE model; generating a product datasheet for the discrete device product using the graphic design system file; and using a second interface generated by a computing device to provide
(Continued)

access to the graphic design system file, the package bonding diagram, the product datasheet, and the product SPICE model.

20 Claims, 6 Drawing Sheets

Related U.S. Application Data continuation of application No. 17/076,039, filed on Oct. 21, 2020, now Pat. No. 11,481,532.

(60) Provisional application No. 62/923,615, filed on Oct. 21, 2019.

(51) Int. Cl.

| | |
|---|---|
| ***G06F 30/367*** | (2020.01) |
| ***G06F 30/392*** | (2020.01) |
| ***G06F 30/398*** | (2020.01) |
| ***G06N 3/04*** | (2023.01) |
| ***G06N 3/08*** | (2023.01) |
| ***G06N 3/084*** | (2023.01) |
| ***G06N 3/09*** | (2023.01) |
| *G06F 111/02* | (2020.01) |
| *G06F 117/12* | (2020.01) |
| *G06F 119/08* | (2020.01) |

(52) U.S. Cl.
CPC ............. *G06F 30/398* (2020.01); *G06N 3/04* (2013.01); *G06N 3/08* (2013.01); *G06F 2111/02* (2020.01); *G06F 2117/12* (2020.01); *G06F 2119/08* (2020.01)

(58) Field of Classification Search
CPC .. G06F 2117/12; G06F 2119/08; G06F 30/39; G06F 30/394; G06N 3/04; G06N 3/08; G06N 3/0499; G06N 3/084; G06N 3/09
See application file for complete search history.

(56) References Cited

U.S. PATENT DOCUMENTS

| | | | | |
|---|---|---|---|---|
| 9,881,120 | B1 * | 1/2018 | Ginetti | G06F 30/367 |
| 11,481,532 | B2 * | 10/2022 | Victory | G06N 3/0499 |
| 11,481,533 | B2 * | 10/2022 | Victory | G06N 3/0499 |
| 11,816,405 | B2 * | 11/2023 | Victory | G06N 3/04 |
| 11,880,642 | B2 * | 1/2024 | Victory | G06N 3/09 |
| 2007/0250800 | A1 | 10/2007 | Keswick | |
| 2013/0033277 | A1 | 2/2013 | Liao et al. | |
| 2014/0007028 | A1 * | 1/2014 | Yang | G06F 30/367 716/106 |
| 2016/0063171 | A1 | 3/2016 | Tripathi et al. | |
| 2019/0050040 | A1 | 2/2019 | Baskaran et al. | |

OTHER PUBLICATIONS

He, C., et al., A Physically Based Scalable SPICE Model for Silicon Carbide Power MOSFETs, IEEE, 2017, pp. 2678-2684.

* cited by examiner

SYSTEMS AND METHODS FOR DESIGNING A DISCRETE DEVICE PRODUCT

CROSS REFERENCE TO RELATED APPLICATIONS

This application is a continuation application of the earlier U.S. Utility Patent Application to Victory et al. entitled "Systems and Methods for Designing a Discrete Device Product," application Ser. No. 17/930,091, filed Sep. 7, 2022, now pending, which application is a continuation application of the earlier U.S. Utility Patent Application to Victory et al. entitled "Systems and Methods for Designing a Discrete Device Product," application Ser. No. 17/076,039, filed Oct. 21, 2020, now issued as U.S. Pat. No. 11,481,532, which application claims the benefit of the filing date of U.S. Provisional Patent Application 62/923,615, entitled "System, Apparatus, and Methods for Custom and/or Automated Design of Semiconductor Devices" to Victory et al. which was filed on Oct. 21, 2019, the disclosures of each of which are hereby incorporated entirely herein by reference.

TECHNICAL FIELD

Aspects of this document relate generally to systems and methods, such as systems and methods for designing a discrete device product. More specific implementations involve systems and methods for automated electronic component design.

BACKGROUND

Electronic components include a wide variety of devices including transistors, resistors, capacitors, and other devices designed to manipulate/control electrical charge. Microprocessors include various electronic components assembled on a single integrated circuit design that are capable of performing various analog or digital calculations.

SUMMARY

Implementations of a system configured for designing a discrete device product may include one or more hardware processors configured by machine-readable instructions to: using a first interface generated by a computing device, receive from a user a selection of at least one die and at least one test condition; generate, using a processor, a product die configuration using a predictive modeling module and the at least one die; generate, using a processor, a graphic design system file using a graphic design system module with the product die configuration; and generate, using a processor, a package bonding diagram using a build diagram system module with the graphic design system file. In various system implementations, the system may be configured to generate, using a processor, a product SPICE model corresponding with the product die configuration with a product SPICE model generating module; provide, using a processor, the product SPICE model to a product simulation module; generate, using a processor, one or more datasheet characteristics of the discrete device product with the product SPICE model using the product simulation module; provide, using a processor, the one or more datasheet characteristics to a datasheet formation module; and generate, using a processor, product datasheet for the discrete device product using the graphic design system file, the package bonding diagram, and the one or more datasheet characteristics. In various system implementations, the system may use a second interface generated by a computing device to provide access to the graphic design system file, the package bonding diagram, the product SPICE model, and the product datasheet to the user.

Implementations of a system for designing a discrete device product may include one, all, or any of the following:

The system may be further configured to: receive a selection of a package type, include the package in the product die configuration, select a die SPICE model corresponding with the one or more die, and select a package SPICE model corresponding with the package type for generating the product SPICE model with the product SPICE model generating module.

The predictive modeling module may include a back propagated model and the back propagated model may be used to predict one or more electrical performance parameters of the discrete device product.

The predictive modeling module may include a back propagated model and the back propagated model may be used to predict a die dimension, gate pad location, or gate runner.

The predictive modeling module may include a back propagated model generated by fitting data from previous discrete device products.

The predictive modeling module may include a back propagated model generated by a neural network training using data from previous discrete device products.

The neural network may include two input neurons, three densely connected hidden layers including rectified linear network unit neurons, and an output layer of linearly activated neurons.

The graphic design system module may use a native parameterized layout cell (PCELL).

The graphic design system module may use a generic parameterized layout cell (PCELL).

The build diagram system module may use a virtual clip to generate the package bonding diagram.

Implementations of a method of designing a discrete device product may include using a first interface generated by a computing device, receiving from a user a selection of at least one die and at least one test condition; generating, using a processor, a product die configuration and a product package configuration using a predictive modeling module and the at least one die; generating, using a processor, a graphic design system file using a graphic design system module with the product die configuration; and generating, using a processor, a package bonding diagram using a build diagram system module with the graphic design system file. In various method implementations, the method may include generating, using a processor, a product SPICE model corresponding with the product die configuration using a product SPICE model generating module; providing, using a processor, the product SPICE model to a product simulation module; generating, using a processor, one or more datasheet characteristics of the discrete device product with the product SPICE model; providing, using a processor, the one or more datasheet characteristics to a datasheet formation module; and generating, using a processor, a product datasheet for the discrete device product using the graphic design system file, the package bonding diagram, and the one or more datasheet characteristics. In various method implementations, the method may include using a second interface generated by a computing device to providing access to the graphic design system file, the package bonding diagram, the package SPICE model, and the product datasheet to the user Various implementations of a method of designing a discrete device product may include one, all, or any of the following:

The method may include: receiving a selection of a package type, including the package in the product die configuration, selecting a die SPICE model corresponding with the one or more die, and selecting a package SPICE model corresponding with the package type for generating the product SPICE model with the product SPICE model generating module.

The predictive modeling module may include a back propagated model and the back propagated model may be used to predict one or more electrical performance parameters of the discrete device product.

The predictive modeling module may include a back propagated model and the back propagated model may be used to predict a die dimension, gate pad location, or gate runner.

The predictive modeling module may include a back propagated model generated by fitting data from previous discrete device products.

The predictive modeling module may include a back propagated model generated by a neural network training using data from previous discrete device products.

The neural network may include two input neurons, three densely connected hidden layers including rectified linear network unit neurons, and an output layer of linearly activated neurons.

The graphic design system module may use a native parameterized layout cell (PCELL).

The graphic design system module may use a generic parameterized layout cell (PCELL).

The build diagram system module may use a virtual clip to generate the package bonding diagram.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DETAILED DESCRIPTION

This disclosure, its aspects and implementations, are not limited to the specific components, assembly procedures or method elements disclosed herein. Many additional components, assembly procedures and/or method elements known in the art consistent with the intended for designing a discrete device product will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for designing a discrete device product, and implementing components and methods, consistent with the intended operation and methods.

Figure 1:
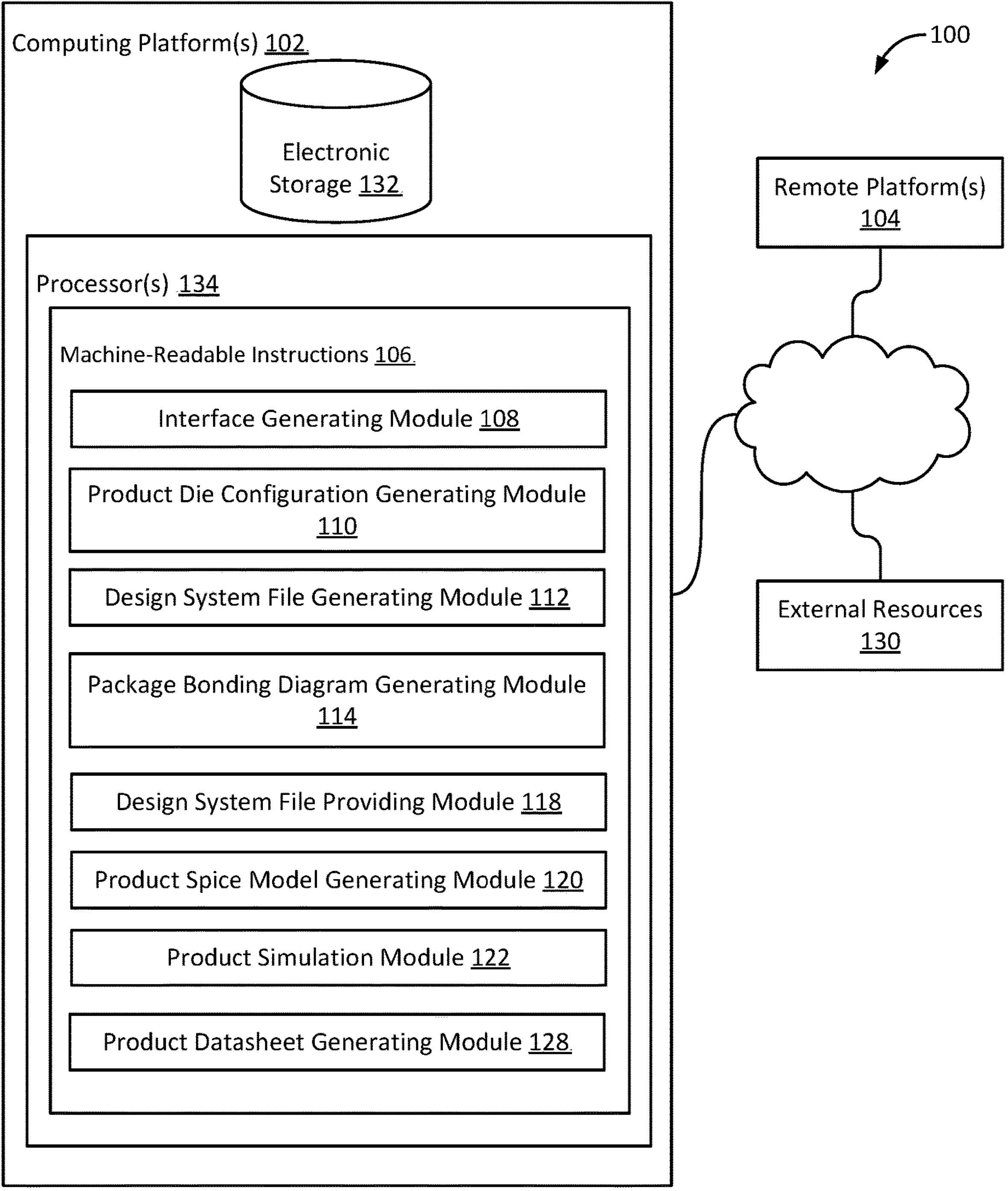
FIG. 1 illustrates a system configured for designing a discrete device product.

FIG. 1 illustrates a system 100 configured for designing a discrete device product, in accordance with one or more implementations. As used herein, a discrete device is a device that is not a microprocessor but is a combination of one or more electronic devices such as, by non-limiting example, a power semiconductor device, a diode, a transistor, a metal oxide field effect transistor (MOSFET), a rectifier, an active component, a passive component, or any other electronic device type, whether in the form of a bare die or a die incorporated in a package. In some implementations, system 100 may include one or more computing platforms 102. Computing platform(s) 102 may be configured to communicate with one or more remote platforms 104 according to a client/server architecture, a peer-to-peer architecture, and/or other architectures. Remote platform(s) 104 may be configured to communicate with other remote platforms via computing platform(s) 102 and/or according to a client/server architecture, a peer-to-peer architecture, and/or other architectures. Users may access system 100 via remote platform(s) 104. Examples of remote platforms 104 that may be used by users include, by nonliving example, desktop computers, server computers, laptop computers, smart phones, tablets, or any other portable electronic device.

Computing platform(s) 102 may be configured by machine-readable instructions 106. Machine-readable instructions 106 may include one or more instruction modules. The instruction modules may include computer program modules. The instruction modules may include one or more of interface generating module 108, product generating module 110, design system file generating module 112, package bonding diagram generating module 114, design system file providing module 118, product SPICE model generating module 120, product SPICE model providing module 122, product datasheet generating module 128, and/or other instruction modules.

Interface generating module 108 is designed to generate a first interface and receive from a user a selection of at least one die and at least one test condition. The die may be selected from at least one technology type, or semiconductor processing flow type used to make the die. In various implementations where the discrete product includes both a die and a package, the first interface may allow the user to select a package type as well. Examples of the first interface will be further described in this document. In the first interface however, a wide variety of product related items may be selected, such as, by non-limiting example, device voltage rating, die width, die height, width the scribe line, width of the gate pad, height of gate pad, number of internal gate runners, location of the gate on a die, die thickness, source metal resistance, lead frame type, gate wire material, gate wire diameter, number of gate wires, source wire material, source wire diameter, number of source wires, emitter wire material, emitter wire diameter, number of source wires, number of emitter wires, single wire stitching, double wire stitching, anode wire material, anode wire diameter, number of anode wires, kelvin wire material, kelvin wire diameter, number of kelvin wires, any combination thereof, and any other die or package parameter. Examples of test conditions that may be selected using the first interface may include, by non-limiting example, varying temperature levels, current at which the threshold voltage is measured, currents at which the $RDS_{on}$ or $VCE_{sat}$ are measured, capacitance values, voltage for capacitance and gate charge, drain current, collector current, drain voltage, collector voltage, switching tests type, load voltage used for resistive and/or inductive switching, external gate resistance used for resistive and/or inductive switching, any combination thereof, and any other desired test parameter. Interface generating module 108 is also designed to generate a second interface and provide access to graphic design system files created by the system. The graphic design system file (GDS file) includes the die layout image and detailed layer geometry file which is used for mask making and further manufacturing steps. By way of non-limiting example, the user may have access to the graphic design system file, the package bonding diagram, the product SPICE model, and the product datasheet through the second interface. The product datasheet may be an initial one or may be a fully finalized product datasheet ready for distribution to customers in various implementations.

While the use of a first interface to select information relating to the discrete product to be developed is disclosed in this document, in particular implementations, a first interface may simply include an interface sufficient to upload a file that contains the desired information. The format of the file being uploaded may be, by non-limiting example, American Standard Code for Information Interchange (ASCII), xml, Java Script Object Notation (JSON), flat file, text file, binary file, or any other file format. In some implementations, the first interface may be implemented using a LINUX terminal session window where the file is selected at the command line and the various modules and methods implemented are implemented in a batch processing mode using the file. In other implementations, a command entered at a command line may bring up a graphical user interface used to select the file and implement the various modules and methods in a batch processing mode using the file. In other implementations, the first interface may be generated using a standalone graphical user interface (form window) generated by the computing system that allows for selecting of the file and execution of the various modules and methods in batch mode. In still other implementations, the first interface may be generated by a web browser or web application with the computing system which allows the user to select the file and then begin execution of the various modules and methods in batch mode. A wide variety of computer interfaces may be employed that allow for batch execution of the various modules and methods disclosed herein using a file.

Product generating module 110 is configured to generate, using a processor, a product die configuration and a product package configuration using a predictive modeling module and the at least one die and the package type if a package type was selected. The predictive modeling module includes a back propagated model and the back propagated model is used to predict one or more electrical performance parameters of the discrete device product. Based on the electrical performance parameter(s) the predictive modeling module and back propagated model are also able to, where a package type was selected, determine package size as well as determine die size, and or die characteristic information in various implementations. By way of non-limiting example, the predictive modeling module may include a back propagated model and the back propagated model is used to predict a die dimension, gate pad location, or gate runner based on desired electrical/performance characteristics for the product ($Rds_{on}$, etc.). The predictive modeling module may include a back propagated model generated by fitting data collected from previous discrete device products. The predictive modeling module may include a back propagated module generated by/from a previously generated scalable product SPICE model like those disclosed herein. By scalable is meant a SPICE model that comprehends changes in electrical, thermal, and/or magnetic performance of the discrete device product due to changes in die and/or package parameters. In various implementations the discrete device products would include either the same type of product being designed, related discrete products, or all products being designed. As used herein, "product" means at least one die and, where a package is included, a corresponding package which is ultimately marketed under a specific part number by a semiconductor device manufacturer. In various implementations, the back propagated model generated by fitting data from measurements or previously generated scalable SPICE models may be created by performing various statistical operations for the various die in packages that are included in the products being compared. In some implementations, data transforms for the data being considered in the model may be utilized. The data transform may be used in normalize the data in such a way that it can be fitted using a regression or other statistical analysis.

In other system implementations, however, the back propagated model may not rely on any statistical analysis of prior products when generating scalable SPICE models. Instead, the use of deep learning/machine learning techniques may be used to develop functions that allow for optimization of particular electrical parameters for the package and/or die. The use of deep learning/machine learning techniques may allow the back propagated model to handle situations beyond the scope of any particular data set and may be helpful in situations where new products are being proposed for the first time. The predictive modeling module may include a back propagated model generated by a neural network trained using data from previous discrete device products.

A wide variety of deep learning solutions may be employed in various supplementations. By deep learning is meant the use of at least 3 layers of densely connected neurons. A wide variety of machine learning techniques have may be utilized to help the network learn including, by non-limiting example, drop out, batch size, stochastic gradient descent, forward propagation, backward propagation, the number of hidden layers, the number of neurons, gradient descent, cross entropy cost, and any other machine learning technique for refining the network. By way of non-limiting example, the neural network in particular and limitations may include two input neurons, three densely connected hidden layers including rectified linear network unit neurons, and an output layer of linearly activated neurons. However, more layers and more neurons or fewer layers and fewer neurons may be used in other limitations.

In various implementations, various die parameters selected by the user in the first interface may affect the electrical/process conditions of the die itself. By non-limiting example, the user may select a particular value for die thickness, normalized peak channel doping, normalized gate oxide thickness, or any other die parameter that affects the electrical/process performance of the die. In various system and method implementations, the system may adjust the scalable SPICE model to correspond with the selected values. Also, in various system and method implementations, the system may adjust a die SPICE model itself to comprehend the effects of the values and continue the various method steps using the various modules disclosed herein. In various implementations, the effects of the various values for the die parameters may be accounted for using, by non-limiting example, a correlation, a look up table, a derived mathematical relationship, a back propagated model, or any other method or system for adjusting SPICE model parameters for a die.

In various system implementations, the first interface may include components that allow the user to select various variation limits for one, any, or all of the electrical parameters associated with the die and/or package. By non-limiting example, these variation limits may be set using the interface to select a minimum or a maximum allowed amount of variation for a particular parameter. In the interface, this selection may be done using a checkbox element. In various implementations, these variation limits may be referred to as corner limits Non-limiting examples of electrical parameters that may employ corner limits may be threshold voltage (Vth), RDSon, capacitance, or Qg or any other or any other electrical parameter of the package in various system and method implementations. During system operation, the corner limits are used in the formation of the scalable SPICE model as the system simulates the corner limits by adjusting internal process parameters in the SPICE model(s) used by the system to create the scalable SPICE model. The resulting scalable SPICE model's ability to predict product performance is accordingly extended within the range of the corner limits. This adjusted scalable SPICE model then can be used by the product simulation model as described hereafter to provide datasheet characteristics that show typical performance as well as performance according to the amount of particular corner limit for a given electrical parameter. These datasheet characteristics can then be included in a datasheet associated with the discrete device product using the processes and systems disclosed hereafter.

Design system generating module 112 may be configured to generate, using a processor, a graphic design system file (GDS file) using a graphic design system module with the product die configuration and the product package configuration. The graphic design system module may use a native parameterized layout cell (PCELL). Where the graphic design system module uses a native PCELL, the settlor includes the full technology device design, layers, and corresponding design rules. The graphic design system module may use a generic PCELL. Where the graphic design system module uses a generic PCELL, the sole only contains the top-level layers of the device that include, by non-limiting example, metal, passivation, or other boundary materials. In either case, in a particular implementation, the graphic design system file is generated by invoking the software marketed under the tradename CADENCE by Cadence Design Systems of San Jose, California, and the native PCELL or generic PCELL in batch mode. Many other software products could be used, however, that include PCELLS as part of the development process.

Package bonding generating module 114 generates, using a processor, a package bonding diagram using a build diagram system module with the graphic design system file. In particular implementations, the package bonding generating module 114 may generate the bonding diagram by invoking a particular tool in batch mode using the generated graphic design system file as an input. By way of non-limiting example, the build diagram system module may utilize any of the die and/or package parameters selected that were previously disclosed. In particular and limitations, these parameters may include package type, package lead frame, number of gate runners, gate position, wire type, wire stitching type, number of source wires, die attach material, or a virtual clip to generate the package bonding diagram.

With respect to the use of a virtual clip, ordinarily, clip type, shape, and structure are selected from a library of previously physically manufactured and tested clip designs. A challenge with modeling a discrete product like those disclosed herein is that the clip designs available in the library simply are not numerous enough to be able to correspond with all of the possible combinations of die size, gate pad position, package size, etc. that could be encountered/considered by a user designing the discrete product. In order to enable the creation of scalable SPICE models for the die and/or package, the use of virtual clips whose sizes, materials, and coverage of the die are determined using various predetermined parameters may be utilized in various implementations. For example, a virtual clip may be selected by the user for inclusion in a particular product design using the first interface and the various system modules (predictive modeling module, build diagram system module, or package bonding generating module in various implementations) may then calculate the shape of an ideal clip for the particular dimensions of the die that was selected by the user. If the user then changes the size of the die (either manually or automatically through input/output of the predictive modeling module), the system then correspondingly resizes the clip. In various implementations, the system may determine the size of the clip using, by non-limiting example, a correlation between clip size and die size (rectangular, etc.), a maximum die coverage model, machine learning, statistical modeling, or any other factors affecting clip performance. In various virtual clip implementations, additional factors may be taken into account to attempt to ensure that the virtual clip as closely approximates the performance of the actual physical clip when the physical clip is made. These additional factors may include, in various implementations, a clip percent coverage reduction factor designed to reduce the coverage of the die by the clip by a percentage intended to mimic non-uniformities in a physical clip, such as but not limited to openings or holes in the clip needed in real life for mechanical/bonding considerations. These factors may also include, by non-limiting example, clip thickness, which allows the system to alter the thickness of the clip to reflect what the actual real world mechanical design of the particular clip may require. The goal of the virtual clip and the various factors is to closely enough approximate the physical and electrical performance of the actual physical clip to ensure the scalable SPICE models developed for the die and/or package create a design that reflects the ultimate electrical/thermal/magnetic performance of the discrete product. The use of virtual clips in various implementations may be an enabler that permits the system to carry out effective modeling of the discrete products so that the results correlate with the actual physical builds.

Once the virtual clip's dimensions have been determined, the package bonding generating module 114 utilizes it for the purposes of developing the bonding diagram. The virtual clip may then be taken to an external vendor for production after the package design is completed. The package bonding generating module 114 may additionally consider other factors including, by non-limiting example, gate restrictions, die rotation, ribbon bonding, stitching orientation, multi-die packages, and any other parameter relevant to die attach, package structure, or die bonding.

Initially, the die SPICE models used in the system are selected by selecting the die technology type and package SPICE models are selected by selecting the package technology/type from which the product will be built. These die SPICE models and package SPICE models are then used to generate a composite scalable SPICE model. The die SPICE models or the package SPICE models may be those that have been previously developed/derived during the process development cycle for use in the discrete product development system.

Design system file providing module 118 may be configured to provide, using a processor, the graphic design system file, the package bonding diagram, and the die SPICE model parameters (and package SPICE model parameters, if a package was selected) to the product SPICE model generating module. Product SPICE model generating module 120 then generates, using a processor, a product SPICE model of the discrete device product using the die and package parameters and the scalable SPICE model for the die and scalable SPICE model for the package (if a package was selected). The product SPICE model generating module may also use a wide variety of computer aided modeling techniques to create the product spice model such as, by non-limiting example, a finite element modeling process, electrical simulations, deep learning techniques, neural networks, engineering calculations numerical methods, any combination of the foregoing, and any other engineering modeling technique capable of creating parameters that can be included in a SPICE model. The resulting product SPICE model is generated with a SPICE agnostic syntax such that any commercial SPICE simulator can be supported. Non-limiting example of commercial SPICE simulators may include the simulator marketed under the tradename PSPICE by Cadence Design Systems; the simulator marketed under the tradename LTSPICE by Analog Devices of Norwood Massachusetts; the simulator marketed under the tradename HSPICE by Synopsys, Inc. of Mountain View, California; the simulator marketed under the tradename ELDO by Mentor Graphics of Wilsonville, Oregon; the simulator marketed under the tradename SIMETRIX by SIMetrix Technologies LTD of Berkshire, UK; the simulator marketed under the tradename SPECTRE by Cadence Design Systems; the simulator marketed under the tradename ADS by Keysight Technologies Inc. of Santa Rosa, California; the simulator marketed under the tradename SABER by Synopsys, Inc.; the simulator marketed under the tradename SIMPLORER by Ansys, Inc. of Canonsburg, Pennsylvania; or the simulator marketed under the tradename MICROCAP by Spectrum Software.

The product SPICE model may be transmitted for inclusion in a database of die or package SPICE models for later selection by a user. In various implementations, a package SPICE model included in the product SPICE model may be provided to a technology computer aided design (TCAD) module during mixed mode, capacitance, current-voltage, or other simulations that involve both finite element analysis and SPICE elements and analysis to enable the TCAD module to carry out such simulations. The output of the TCAD module can be stored in a database of that can be subsequently used by the system to generate new product SPICE models and further SPICE product models, using the methods disclosed herein In various implementations, product simulation module 122 receives, using a processor, the product SPICE model. The product simulation module 122 then uses the product SPICE model and the at least one test conditions specified to generate a set of data sheet characteristics for the product. In particular implementations the product simulation module may utilize any of the simulation software products disclosed in this document to conduct the simulations. Product simulation module 122 generates, using a processor, one or more datasheet characteristics of the discrete device product with the product SPICE model. By way of non-limiting example, the one or more datasheet characteristics may include maximum rating, thermal characteristics, package outline, current-voltage characteristics, capacitance and gate charge characteristics, dynamic switching and reverse recovery characteristics, safe operating area characteristics or any other desired discrete product parameter desired for inclusion in a datasheet. By way of non-limiting example, the one or more datasheet characteristics may include a product performance graph, a product performance table, a product pinout, a package outline, or a product specification.

Product simulation module 122 then provides, using a processor, the one or more datasheet characteristics to a datasheet formation module 128. Product datasheet generating module 128 generates, using a processor, a product datasheet for the discrete device product using the graphic design system file, the package bonding diagram, and the one or more datasheet characteristics. The product datasheet may be automatically submitted for inclusion in a product datasheet database. In various implementations the datasheet formation module 128 employs the document preparation system marketed the tradename LATEX by The LATEX Project. However, in other implementations, the data sheet formation module 128 may use many other document preparation systems, data formats, typefaces, and fonts as desired to generate datasheet. Once the product datasheet has been generated, the second interface is used to provide access for the user to the graphic design system file, the package bonding diagram, the product SPICE model, and the product datasheet as will be described hereafter.

In various implementations, the use of the product simulation module and datasheet formation module may not be used during at least an initial phase of design. In such implementations, the system may be used iteratively by the user to find a die size and/or package size that can provide a desired electrical/performance characteristics with each simulation run taking seconds. Once the die size and/or package size has been identified, the user may then indicate (either through selecting a different mode of operation or selecting each module individually) that the product simulation module and datasheet formation module are to participate in the simulation flow of the system. In such implementations, this may allow the user to speed the process of finding key product parameters up front and then allow for in depth verification/checking of the full electrical/thermal performance of the product design afterward with the product simulation module and datasheet formation module. In various implementations, the first interface may have an indicator button or other selector to allow the user to leave out or include the product simulation module and datasheet formation module in the simulation process/flow.

In some implementations, computing platform(s) 102, remote platform(s) 104, and/or external resources 130 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 102, remote platform(s) 104, and/or external resources 130 may be operatively linked via some other communication media.

A given remote platform 104 may include one or more processors configured to execute computer program modules. The computer program modules may be configured to enable an expert or user associated with the given remote platform 104 to interface with system 100 and/or external resources 130, and/or provide other functionality attributed herein to remote platform(s) 104. By way of non-limiting example, a given remote platform 104 and/or a given computing platform 102 may include one or more of a server, a desktop computer, a laptop computer, a handheld computer, a tablet computing platform, a NetBook, a Smartphone, a gaming console, and/or other computing platforms.

External resources 130 may include sources of information outside of system 100, external entities participating with system 100, and/or other resources. In some implementations, some or all of the functionality attributed herein to external resources 130 may be provided by resources included in system 100.

Computing platform(s) 102 may include electronic storage 132, one or more processors 134, and/or other components. Computing platform(s) 102 may include communication lines, or ports to enable the exchange of information with a network and/or other computing platforms. Illustration of computing platform(s) 102 in FIG. 1 is not intended to be limiting. Computing platform(s) 102 may include a plurality of hardware, software, and/or firmware components operating together to provide the functionality attributed herein to computing platform(s) 102. For example, computing platform(s) 102 may be implemented by a cloud of computing platforms operating together as computing platform(s) 102.

Electronic storage 132 may include non-transitory storage media that electronically stores information. The electronic storage media of electronic storage 132 may include one or both of system storage that is provided integrally (i.e., substantially non-removable) with computing platform(s) 102 and/or removable storage that is removably connectable to computing platform(s) 102 via, for example, a port (e.g., a USB port, a firewire port, etc.) or a drive (e.g., a disk drive, etc.). Electronic storage 132 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 132 may include one or more virtual storage resources (e.g., cloud storage, a virtual private network, and/or other virtual storage resources). Electronic storage 132 may store software algorithms, information determined by processor(s) 134, information received from computing platform(s) 102, information received from remote platform(s) 104, and/or other information that enables computing platform(s) 102 to function as described herein.

Processor(s) 134 may be configured to provide information processing capabilities in computing platform(s) 102. As such, processor(s) 134 may include one or more of a digital processor, an analog processor, a digital circuit designed to process information, an analog circuit designed to process information, a state machine, and/or other mechanisms for electronically processing information. Although processor(s) 134 is shown in FIG. 1 as a single entity, this is for illustrative purposes only. In some implementations, processor(s) 134 may include a plurality of processing units. These processing units may be physically located within the same device, or processor(s) 134 may represent processing functionality of a plurality of devices operating in coordination. Processor(s) 134 may be configured to execute modules 108, 110, 112, 114, 118, 120, 122, and/or 128, and/or other modules. Processor(s) 134 may be configured to execute modules 108, 110, 112, 114, 118, 120, 122, and/or 128, and/or other modules by software; hardware; firmware; some combination of software, hardware, and/or firmware; and/or other mechanisms for configuring processing capabilities on processor(s) 134. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 118, 120, 122, and/or 128 are illustrated in FIG. 1 as being implemented within a single processing unit, in implementations in which processor(s) 134 includes multiple processing units, one or more of modules 108, 110, 112, 114, 118, 120, 122, and/or 128 may be implemented remotely from the other modules. The description of the functionality provided by the different modules 108, 110, 112, 114, 118, 120, 122, and/or 128 described below is for illustrative purposes, and is not intended to be limiting, as any of modules 108, 110, 112, 114, 118, 120, 122, and/or 128 may provide more or less functionality than is described. For example, one or more of modules 108, 110, 112, 114, 118, 120, 122, and/or 128 may be eliminated, and some or all of its functionality may be provided by other ones of modules 108, 110, 112, 114, 118, 120, 122, and/or 128. As another example, processor(s) 134 may be configured to execute one or more additional modules that may perform some or all of the functionality attributed below to one of modules 108, 110, 112, 114, 118, 120, 122, and/or 128.

Figure 3:
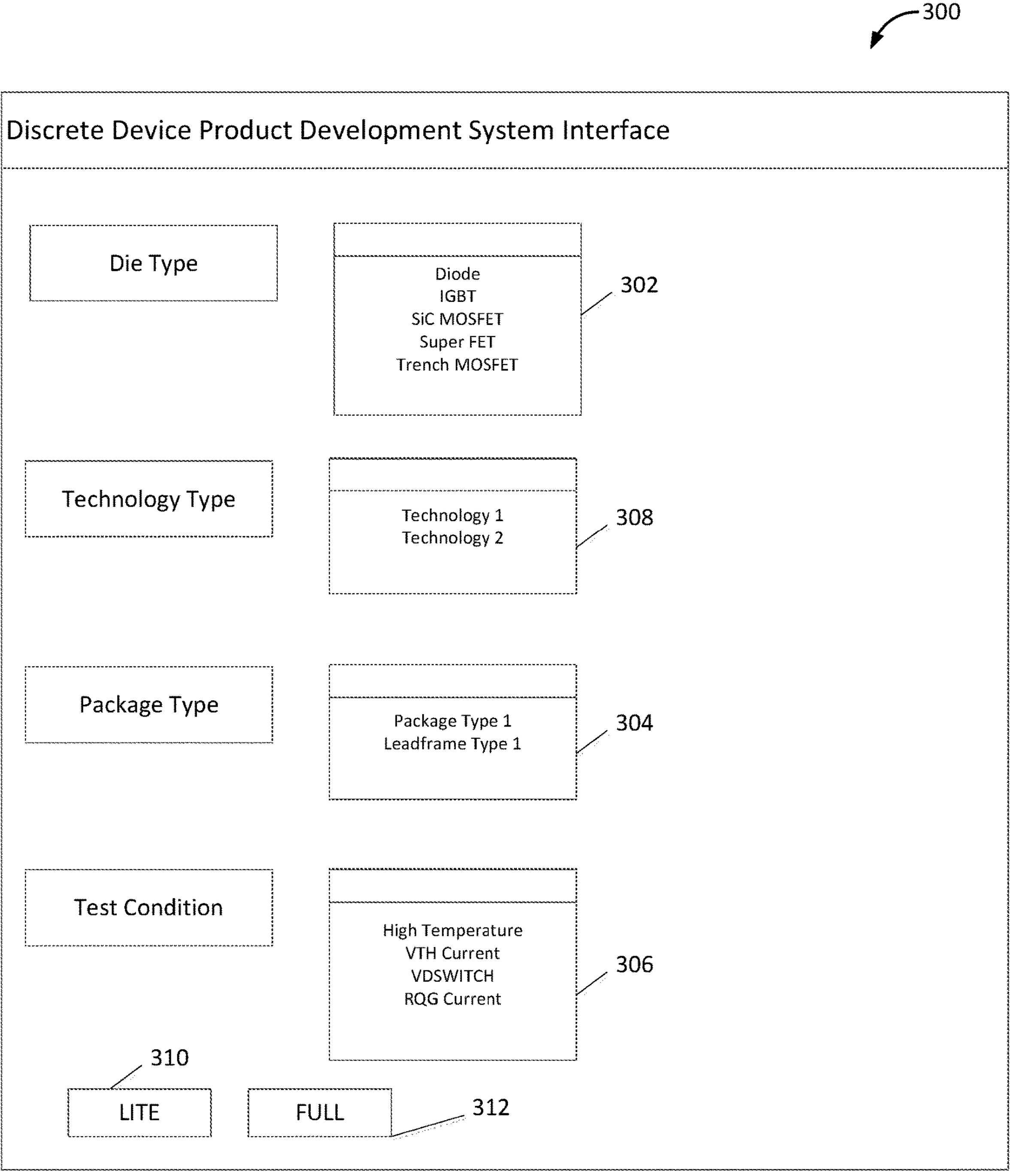
FIG. 3 is a diagram of an implementation of a first computer generated interface.

Referring to FIG. 3, an implementation of a first interface or product data entry interface 300 is illustrated. As illustrated, in this implementation, the interface 300 includes a die type drop down 302 that allows the user to select between different die/device types. Also as illustrated, interface 300 includes a package type drop down 304 which allows the user to select between different package types, lead frame types, or package and lead frame types. As illustrated, the interface 300 includes a technology drop down 308 that allows the user to select a technology type either for the die, the package, or both the die or package. As illustrated, the interface 300 also includes a test condition drop down 306 which is designed to allow the user to select one or more test parameters for use by the product simulation module later in the process flow. While the use of drop-down menus has been illustrated in the interface implementation 300 illustrated in FIG. 3, radio buttons or other control types may be used in other interface applications. Also as illustrated, the interface 300 includes a button 310 that allows the user to execute a simulation run that does not include the product simulation module and datasheet generating module (LITE) and a button 312 that allows the user to execute a simulation run that does include all of the modules in the flow (FULL).

Figure 4:
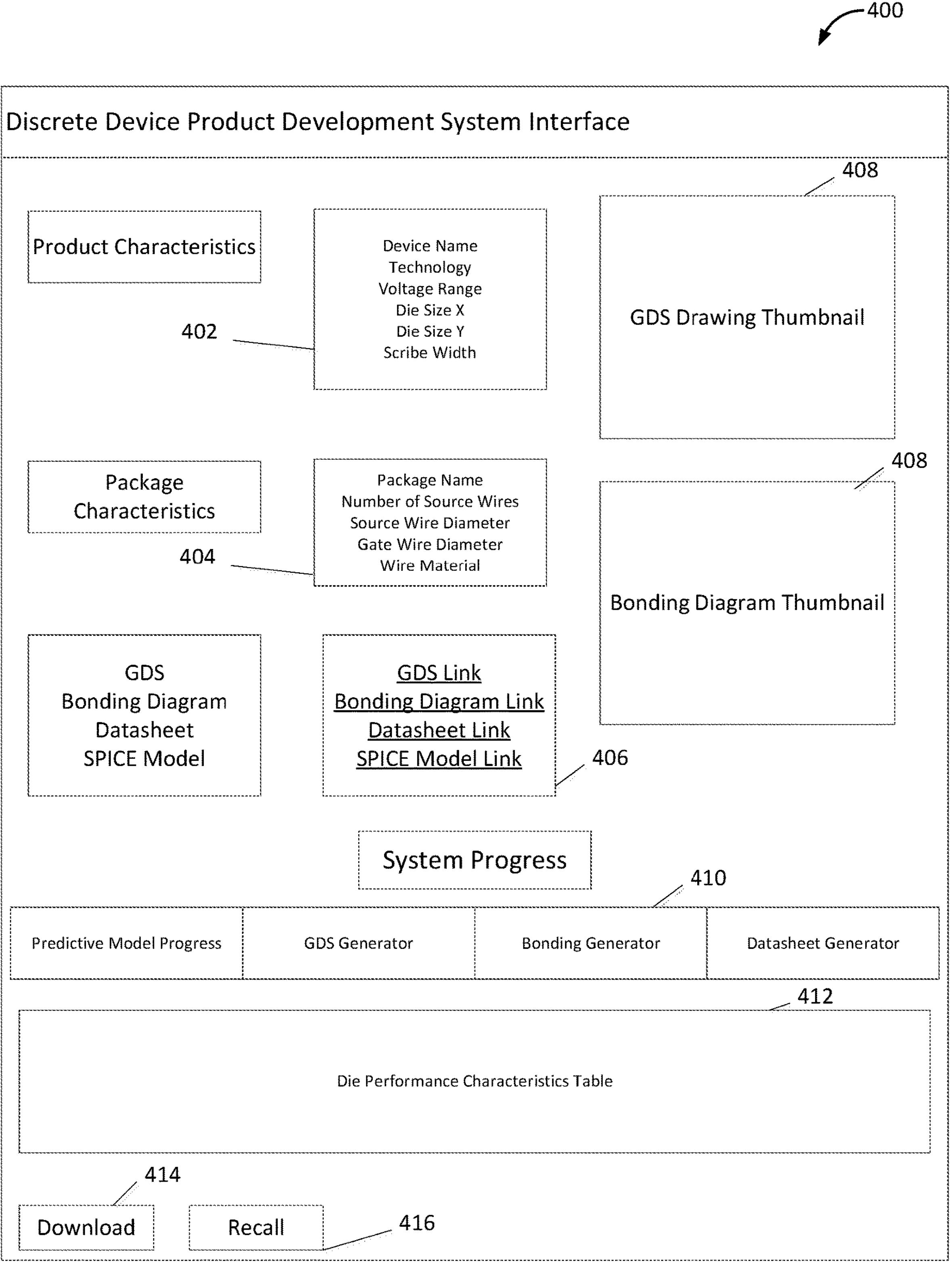
FIG. 4 is a diagram of an implementation of a second computer generated interface.

Referring to FIG. 4, an implementation of an output interface 400 is illustrated. In the output interface 400 the output of the various modules is displayed. For example, in the interface implementation 400 illustrated, various product characteristics 402 of the product that has been designed are illustrated in the interface. As illustrated, these product characteristics can include the name of the device, the technology, the voltage range of the device, the die size in X, the die size in Y, the scribe width, or any other desired product characteristic. In another portion of the interface 400 various package characteristics 404 may be included. As illustrated, these package characteristics may include the package name, number of source wires, source wire diameter, gate wire diameter, wire material, or any other characteristic of the package. The interface 400 also includes a section where that user can access via various links the graphics design system file, the bonding diagram, the data sheet, and the product SPICE model. The product SPICE model may be provided in encrypted and unencrypted form in various implementations and may be provided to be executable using any of the simulator types disclosed herein. Also included in various implementations may be a system progress report 410 which allows the user to see though color coding the progress of the system through predictive modeling, graphic design system file generation, bonding diagram generation, data sheet generation, and any other system module. In various implementations, the system may be able to show the user via the system progress report 410 whether any one of the modules encountered a fault so that the user can then take appropriate action. In very simple notations the fault may be by changing the color surrounding the text of the appropriate module from green to red or to any other desired color.

Referring to FIG. 4, following the completion of the output of the various modules, a die performance characteristics table 412 may be included in various interface implementations. In various interface implementations a Download button 414 may be included which may allow the user to download a file that contains the various die performance characteristics in various file formats which may be any disclosed in this document. Also in various implementations, a Recall button 416 may be used to allow the user to take the calculated die size, package characteristics, die performance characteristics, or any other calculated parameter from the output of the various modules and transfer them to a new version of the first interface for future and/or iterative processing by the user.

Figure 5:
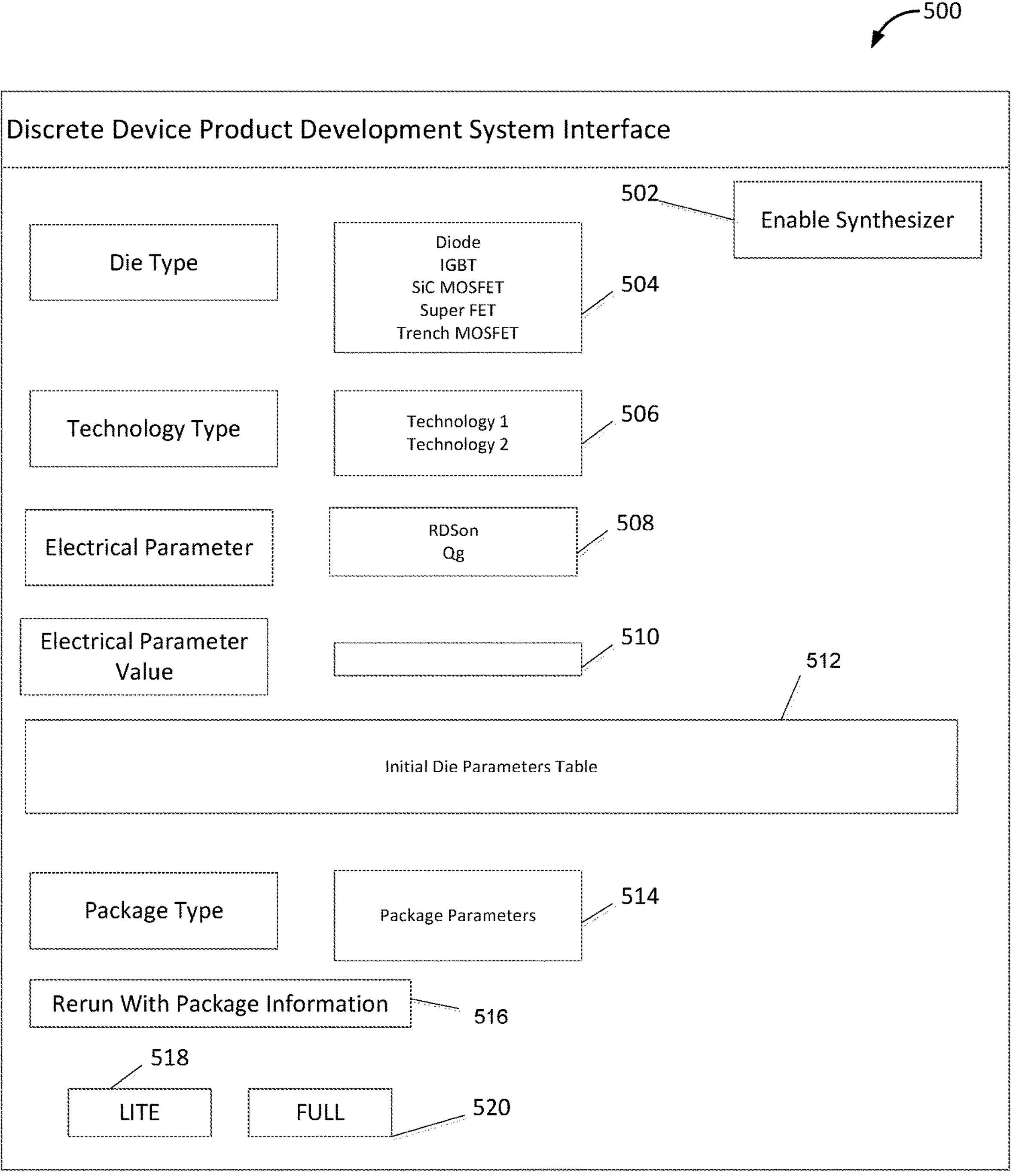
FIG. 5 is a diagram of another implementation of a first computer generated interface.

Referring to FIG. 5, a second implementation of a first interface 500 is illustrated. In this implementation the user may select a die type using a die type selection dialog 504, and a technology type using technology type selection dialog 506. At this point the user then enters the particular electrical parameter(s) desired for the die and/or package optimization, in this case RDSon or Qg. Once the electrical parameter type has been selected via the electrical parameter dialog 508, the user enters the desired value of the electrical parameter in dialog 510. The user then presses the Enable Synthesizer button 502 to begin the work of the predictive modeling module with the die, technology, and electrical parameter information. In various implementations the predictive modeling module may be any disclosed in this document and may use any method of predictive modeling disclosed in this document. This includes using a back propagated model using fitted data, a back propagated model generated by a neural network, or a scalable SPICE model. Following work by the predictive modeling module, the interface may be updated to include a set of initial die parameters in the form of initial die parameters table 512. These initial die parameters are those calculated to meet the particular electrical parameter value entered by the user. For example if the electrical parameter was RDSon, the goal of the predictive modeling module would be to find the smallest die area possible that would yield a device that produces the entered value for RDSon.

Following simulation, if the product is a bare die, then these initial die parameters are those desired by the user as calculated by the predictive modeling module. However in those implementations where the system is being asked to model a discrete device product that includes both a die and the package, the predictive modeling module needs to take the electrical/thermal/magnetic effects of the package into account to design a product that meets the desired electrical parameter value. In such implementations, the user then uses package parameters dialog 514. These package parameters may be any disclosed in this document for a package. Following entry of the package type and package parameters the user may then presses the Rerun With Package Information button 516 to send the package information to the predictive modeling module. In various implementations, the predictive modeling module uses a scalable SPICE model for the package like those disclosed herein in its calculations with the existing previously calculated initial die parameters to then recalculate the die parameters needed to meet the electrical parameter value target entered by the user. The initial die parameters table 512 then may be updated with the newly calculated die parameters. For example, the effect of adding the package may result in increasing die size from the originally calculated die size to enable the resulting product to reach the desired RDSon target.

At this point, the user may then select the LITE button 518 or the FULL button 520 to carry out the work of the remaining modules disclosed in the system. In various implementations, the LITE button 518 may carry out the various simulation activities without producing a datasheet as previously disclosed in this document. In various implementations, the full button 520 may be used to carry out the various simulation activities and also generate a datasheet as previously disclosed in this document. Also in various implementations a recall button could be used to send die parameters, technology parameters, and/or electrical parameters to this implementation of the first interface 500 as disclosed in this document.

Figure 2A:
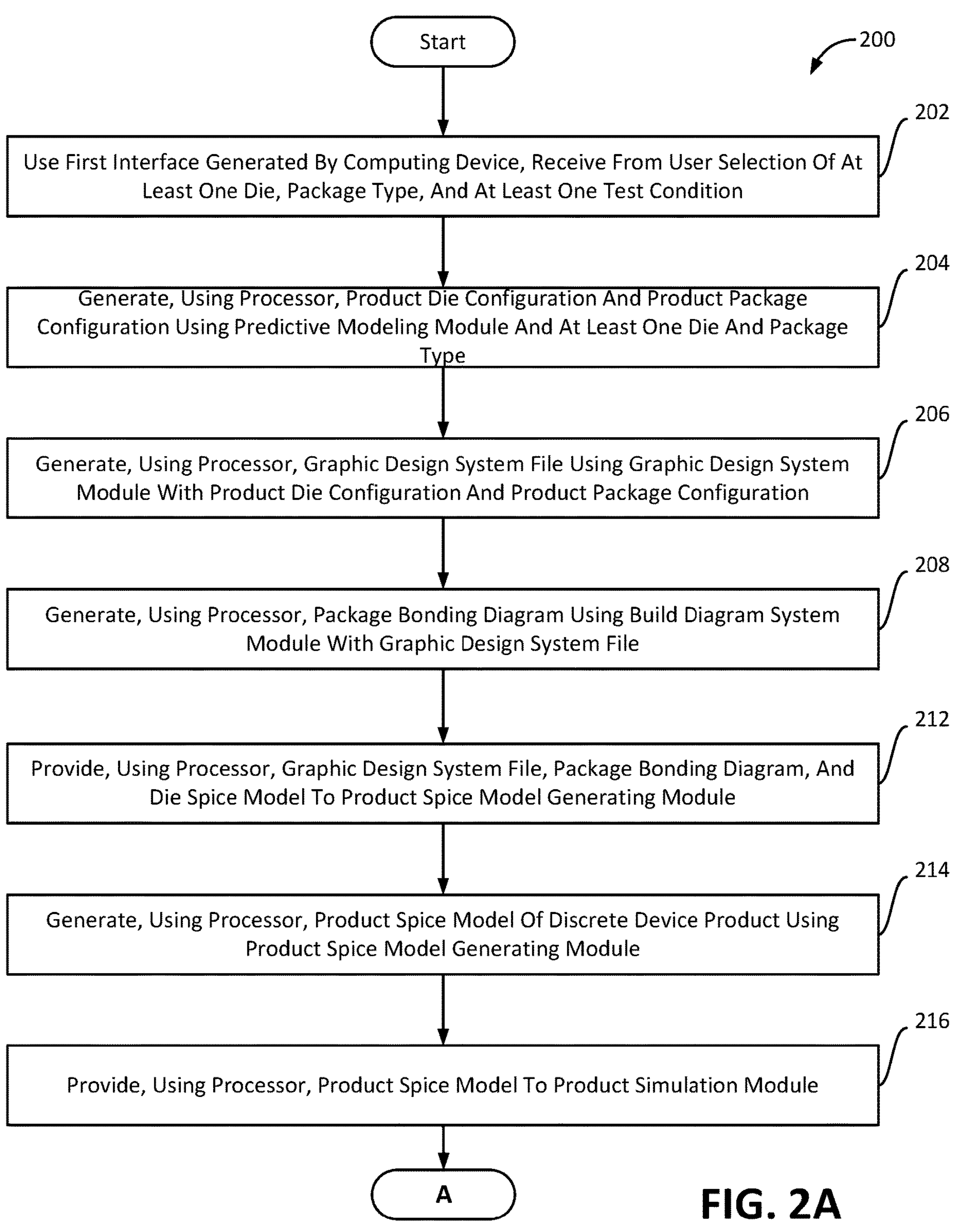
FIG. 2A illustrates a first portion of a flowchart of an implementation of a method for designing a discrete device product.
Figure 2B:
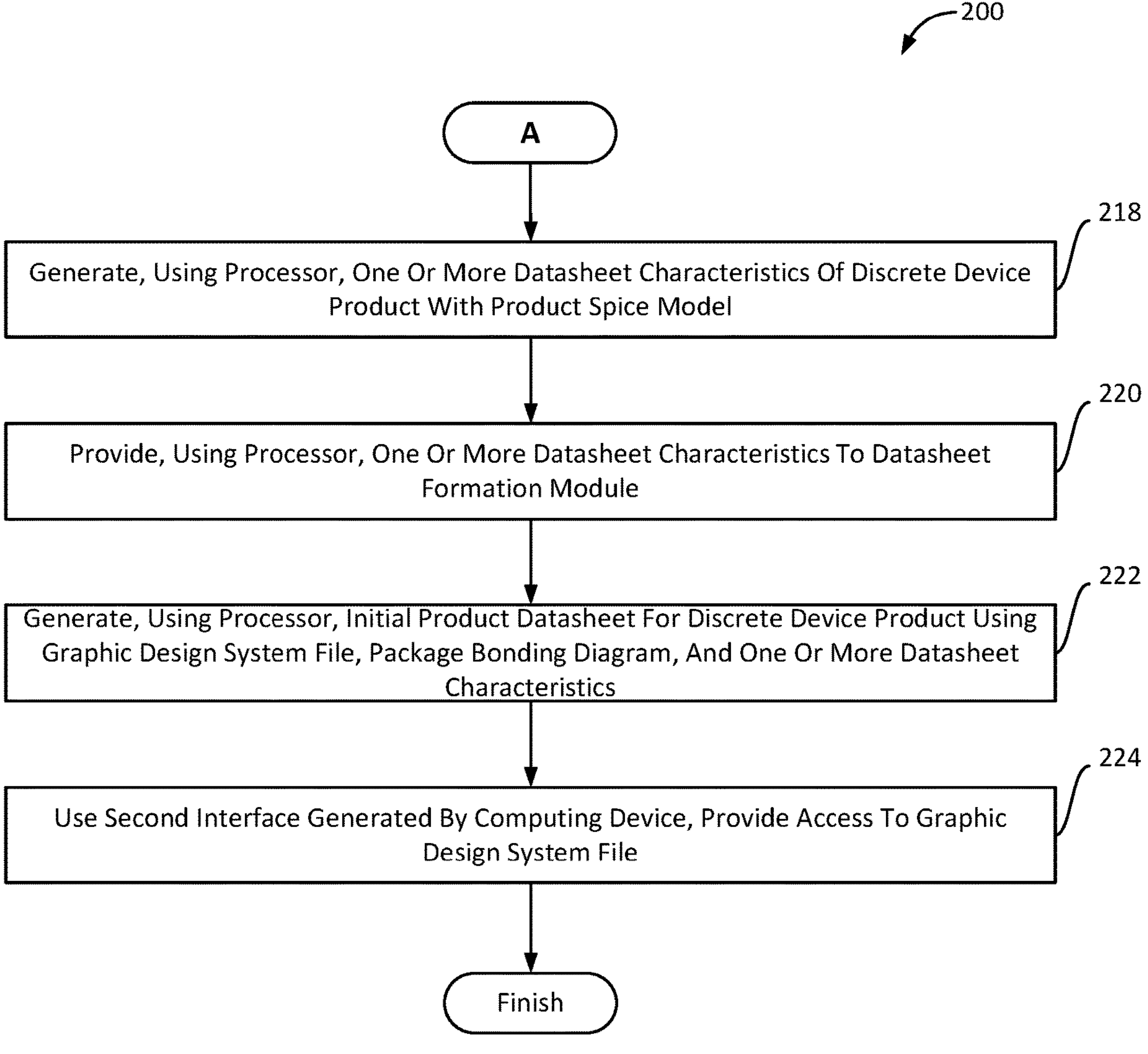
FIG. 2B illustrates a second portion of a flowchart of an implementation of a method for designing a discrete device product.

FIGS. 2A and 2B illustrate an implementation of a method 200 for designing a discrete device product, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 includes, using a first interface generated by a computing device, receiving from a user a selection of at least one die, a package type (if a package is to be selected), and at least one test condition. Operation 202 may be performed by one or more hardware processors configured by machine-readable instructions including a module that is the same as or similar to interface using module 108, in accordance with one or more implementations. In various implementations the first interface may resemble interface 300 of FIG. 3.

An operation 204 includes generating, using a processor, a product die configuration (and a product package configuration, if a package was selected) using a predictive modeling module and the at least one die and the package type. Operation 204 may be performed by one or more hardware processors configured by machine-readable instructions including a module that is the same as or similar to product generating module 110, in accordance with one or more implementations. Any of the model types disclosed herein may be employed in the generation process.

An operation 206 includes generating, using a processor, a graphic design system file using a graphic design system module with the product die configuration (and the product package configuration if a package was selected). Operation 206 may be performed by one or more hardware processors configured by machine-readable instructions including a module that is the same as or similar to design system generating module 112, in accordance with one or more implementations.

An operation 208 includes generating, using a processor, a package bonding diagram using a build diagram system module with the graphic design system file. Operation 208 may be performed by one or more hardware processors configured by machine-readable instructions including a module that is the same as or similar to package bonding generating module 114, in accordance with one or more implementations.

An operation 212 includes providing, using a processor, the graphic design system file, the package bonding diagram (if a package was selected), and a die SPICE model (along with a package SPICE model if a package was selected) to a product SPICE model generating module. Operation 212 may be performed by one or more hardware processors configured by machine-readable instructions including a module that is the same as or similar to design system file providing module 118, in accordance with one or more implementations.

An operation 214 includes generating, using a processor, a product SPICE model of the discrete device product using the product SPICE model generating module. Operation 214 may be performed by one or more hardware processors configured by machine-readable instructions including a module that is the same as or similar to product SPICE model generating module 120, in accordance with one or more implementations.

An operation 216 includes providing, using a processor, the product SPICE model to a product simulation module. Operation 216 may be performed by one or more hardware processors configured by machine-readable instructions including a module that is the same as or similar to product simulation module 122, in accordance with one or more implementations.

An operation 218 includes generating, using a processor, one or more datasheet characteristics of the discrete device product with the product SPICE model and the product simulation module 122. Operation 218 may be performed by one or more hardware processors configured by machine-readable instructions including a module that is the same as or similar to product simulation module 122, in accordance with one or more implementations.

An operation 220 includes providing, using a processor, the one or more datasheet characteristics to a datasheet formation module 128. Operation 220 may be performed by one or more hardware processors configured by machine-readable instructions including a module that is the same as or similar to datasheet characteristic formation module 128 or product simulation module 122, in accordance with one or more implementations.

An operation 222 includes generating, using a processor, a product datasheet for the discrete device product using the graphic design system file, the package bonding diagram, and the one or more datasheet characteristics. Operation 222 may be performed by one or more hardware processors configured by machine-readable instructions including a module that is the same as or similar to product datasheet generating module 128, in accordance with one or more implementations.

An operation 224 includes using a second interface generated by a computing device, providing access to the graphic design system file. Access to the package bonding diagram, the package SPICE model, and the product datasheet are provided to the user via the second interface. Operation 224 may be performed by one or more hardware processors configured by machine-readable instructions including a module that is the same as or similar to interface generating module 108, in accordance with one or more implementations. This interface may look, and various implementations, like the interface illustrated in FIG. 4.

In places where the description above refers to particular implementations for designing a discrete device product and implementing components, sub-components, methods and sub-methods, it should be readily apparent that a number of modifications may be made without departing from the spirit thereof and that these implementations, implementing components, sub-components, methods and sub-methods may be applied to other techniques for designing a discrete device product.

What is claimed is:

1. A system configured for designing a discrete device product, the system comprising:

one or more hardware processors configured by machine-readable instructions to:

receive from a user a selection of at least one discrete device die and a selection of at least one test condition;

generate a product die configuration using the at least one discrete device die and a predictive modeling module;

generate a graphic design system file using a graphic design system module with the product die configuration;

generate a package bonding diagram using a build diagram system module with the graphic design system file;

generate a product SPICE model corresponding with the product die configuration with a product SPICE model generating module;

provide the product SPICE model to a product simulation module;

generate one or more datasheet characteristics of the discrete device product with the product SPICE model using the product simulation module;

provide the one or more datasheet characteristics to a datasheet formation module;

generate product datasheet for the discrete device product using the graphic design system file, the package bonding diagram, and the one or more datasheet characteristics; and provide access to the graphic design system file, the package bonding diagram, the product SPICE model, and the product datasheet to the user.

2. The system of claim 1, wherein the system is further configured to:

receive a selection of a package type, include the package type in the product die configuration, select a die SPICE model corresponding with the at least one discrete device die, and select a package SPICE model corresponding with the package type for generating the product SPICE model with the product SPICE model generating module.

3. The system of claim 1, wherein the predictive modeling module comprises a back propagated model and the back propagated model is used to predict one or more electrical performance parameters of the discrete device product.

4. The system of claim 1, wherein the graphic design system module uses one of a native parameterized layout cell (PCELL) or a generic parameterized layout cell (PCELL).

5. The system of claim 1, wherein the predictive modeling module comprises a back propagated model generated by fitting data from previous discrete device products.

6. The system of claim 5, wherein the back propagated model is used to predict a die dimension, gate pad location, or gate runner.

7. The system of claim 1, wherein the build diagram system module uses a virtual clip to generate the package bonding diagram.

8. A system configured for designing a discrete device product, the system comprising:

one or more hardware processors configured by machine-readable instructions to:

receive from a user a selection of at least one discrete device die and a selection of at least one test condition;

generate a product die configuration the at least one discrete device die and a predictive modeling module comprising a back propagated model generated by fitting data from previous discrete device products;

generate a graphic design system file using a graphic design system module with the product die configuration;

generate a package bonding diagram using a build diagram system module with the graphic design system file; and generate a product SPICE model corresponding with the product die configuration with a product SPICE model generating module.

9. The system of claim 8, where the system is further configured to: receive a selection of a package type, include the package type in the product die configuration, select a die SPICE model corresponding with the at least one discrete device die, and select a package SPICE model corresponding with the package type for generating the product SPICE model with the product SPICE model generating module.

10. The system of claim 8, wherein the back propagated model is used to predict one or more electrical performance parameters of the discrete device product.

11. The system of claim 8, wherein the back propagated model is used to predict a die dimension, gate pad location, or gate runner.

12. The system of claim 8, wherein the graphic design system module uses a native parameterized layout cell (PCELL).

13. The system of claim 8, wherein the graphic design system module uses a generic parameterized layout cell (PCELL).

14. A method of designing a discrete device product, the method comprising:

receiving from a user a selection of at least one discrete device die and a selection of at least one test condition;

generating, using a processor, a product die configuration and a product package configuration using a predictive modeling module and the at least one discrete device die, the predictive modeling module comprising a back propagated model;

generating, using the processor, a graphic design system file using a graphic design system module with the product die configuration;

generating, using the processor, a package bonding diagram using a build diagram system module with the graphic design system file;

generating, using the processor, a product SPICE model corresponding with the product die configuration using a product SPICE model generating module;

providing, using the processor, the product SPICE model to a product simulation module;

generating, using the processor, one or more datasheet characteristics of the discrete device product with the product SPICE model;

providing, using the processor, the one or more datasheet characteristics to a datasheet formation module;

generating, using the processor, a product datasheet for the discrete device product using the graphic design system file, the package bonding diagram, and the one or more datasheet characteristics; and providing access to the graphic design system file, the package bonding diagram, the product SPICE model, and the product datasheet to the user.

15. The method of claim 14, further comprising: receiving a selection of a package type, including the package type in the product die configuration, selecting a die SPICE model corresponding with the at least one discrete device die, and selecting a package SPICE model corresponding with the package type for generating the product SPICE model with the product SPICE model generating module.

16. The method of claim 14, wherein the back propagated model is used to predict one or more electrical performance parameters of the discrete device product.

17. The method of claim 14, wherein the back propagated model is used to predict a die dimension, gate pad location, or gate runner.

18. The method of claim 14, wherein the graphic design system module uses a native parameterized layout cell (PCELL) or a generic parameterized layout cell (PCELL).

19. The method of claim 14, wherein the back propagated model is generated by fitting data from previous discrete device products.

20. The method of claim 14, wherein the build diagram system module uses a virtual clip to generate the package bonding diagram.

* * * * *